(No Model.) 2 Sheets—Sheet 1.

T. L. AMPHLETT.
JUG.

No. 267,641. Patented Nov. 14, 1882.

Witnesses
Walter Donaldson
F. L. Middleton

Inventor
T. L. Amphlett
by Eui Shear
Att'y.

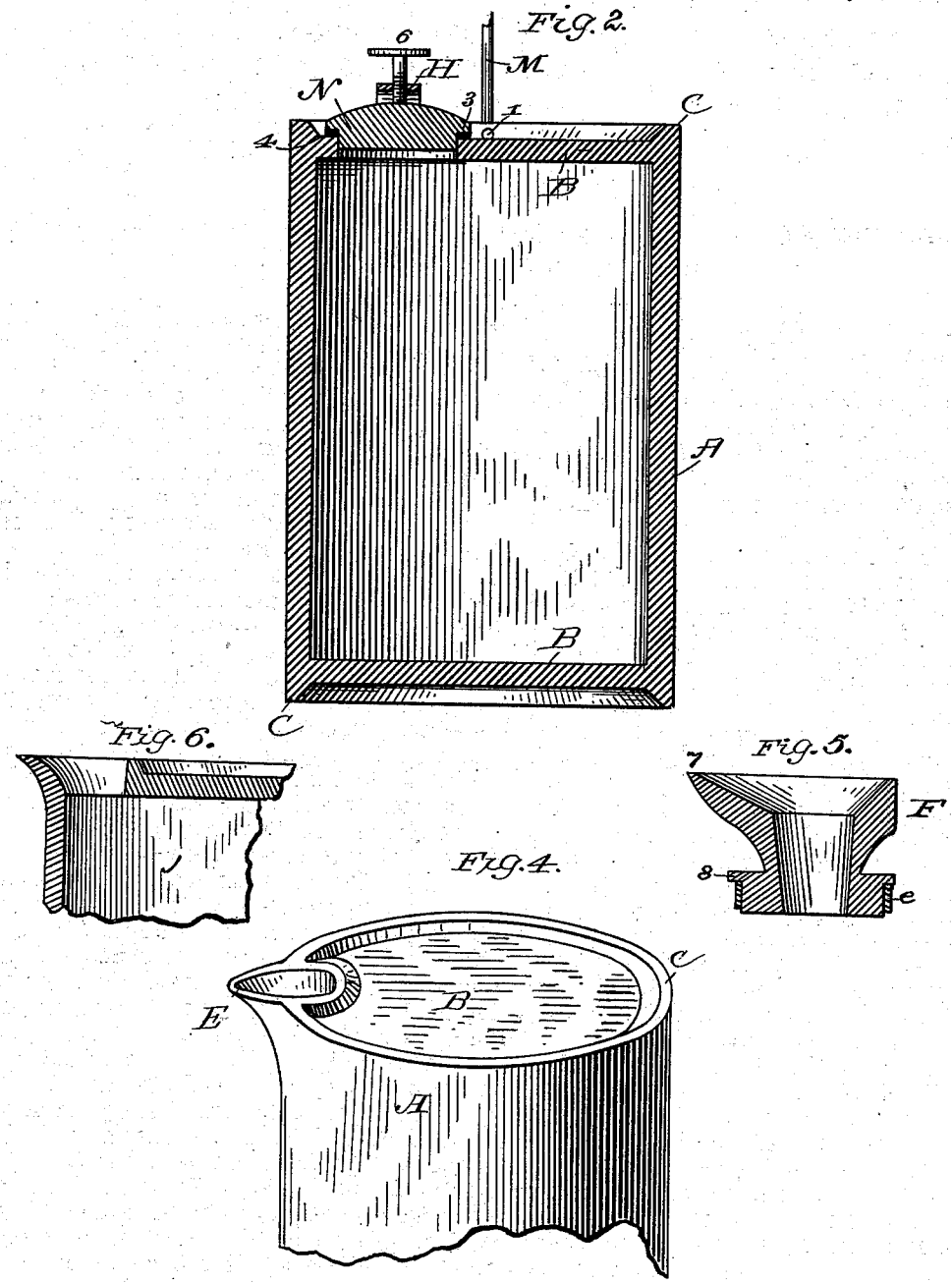

UNITED STATES PATENT OFFICE.

THOMAS L. AMPHLETT, OF IONIA, MICHIGAN, ASSIGNOR TO HIMSELF AND WM. O. AMPHLETT, JOHN B. AMPHLETT, AND THOMAS G. AMPHLETT, ALL OF SAME PLACE.

JUG.

SPECIFICATION forming part of Letters Patent No. 267,641, dated November 14, 1882.

Application filed March 16, 1882. (No model.)

*To all whom it may concern:*

Be it known that I, THOMAS L. AMPHLETT, of Ionia, in the county of Ionia and State of Michigan, have invented a new and useful Improvement in Jugs; and I do hereby declare that the following is a full, clear, and exact description of the same.

My invention relates to an improvement in the manufacture of earthenware jugs or jars intended for the reception and preservation of various kinds of solid and liquid material.

Earthenware jugs are usually made by hand with a tapering top and a handle formed integral with the body and placed either at the top or on the side of the jug. The liability of a handle so placed to be broken detracts greatly from the usefulness of these jugs, while from their tapering shape they could not be placed in stands and burned in the kiln, nor conveniently and closely packed for transportation, all combining to render their manufacture difficult and their use inconvenient and hazardous. An attempt has been made to overcome this objection by providing projecting lugs on the top of the jug, perforated to receive a bail, such jug having an integral mouth-piece; but the projecting lugs are fully as much exposed as the ordinary handle, and if broken render the jug practically worthless.

The object of my invention is to furnish a jug of such shape that a number of them can be burned in the kiln in stands and conveniently and closely packed for shipment without exposed projecting lugs for the handles; and the invention consists in an earthenware jug of substantially cylindrical form, with a plane top and bottom, and having an orifice for the insertion of removable mouth-pieces or nozzles, and a rim or flange at top or bottom, the upper flange being provided with means for securing a removable handle, and a removable pressure device for forcing the cover into position and retaining it there, all as fully hereinafter explained.

Figure 1:
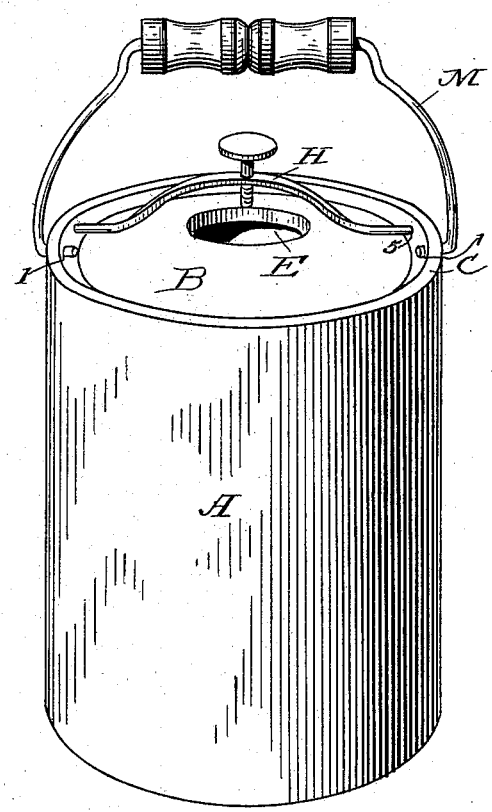
Figure 3:
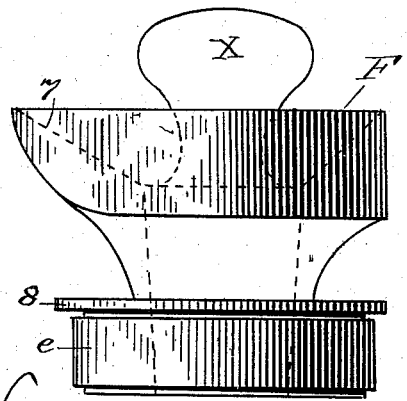

In the drawings, Figure 1 is a perspective of my invention with the bail and pressure-plate in position and the opening in the top for the reception of a cover or nozzle. Fig. 2 is a vertical section taken through the removable cover. Fig. 3 is a separate side elevation of the removable nozzle, and Figs. 4 and 5 are respectively modifications of mouth-piece and section of device shown in Fig. 3; and Fig. 6 is a section of the device shown in Fig. 4.

The jug A is of earthenware, of substantially cylindrical form, and with a plane top and bottom. Both the top and bottom are recessed or sunken, as shown in Fig. 2, leaving a rim or flange, C, of circular shape. Holes 1 1 are formed in the rim opposite one another, and into these holes are sprung the ends of a bail, M, which is thus rendered easily and readily detachable. Near the edge of the top B is a circular opening, E, of suitable size to permit the admission or withdrawal of the contents of the jar. This opening is designed to be closed either by a cover, N, as shown in Fig. 2, or by a removable nozzle, F, as separately illustrated in Fig. 3. The cover N has a rounded top and fits closely into the orifice E, its flange 3 bearing on the face of the top B, or on an interposed rubber ring or gasket, 4, Fig. 2. The cover is forced down and held in position by an elastic metallic pressure-bar, H, the ends of which are sprung into holes 5, Fig. 1, and which is of arched shape, and provided with a set-screw, 6, which bears on the top of the cover. The orifice is adapted also for the insertion of the removable mouth-piece or nozzle F, Fig. 3. This nozzle is hollow, as indicated in Fig. 5 and by dotted lines in Fig. 3, and has a flaring mouth, 7, to discharge the contents free of the side of the vessel, and a flange, 8, which bears on the top of the jar or on an interposed gasket, if desired. The nozzle is detachable, and may be made to fit all sizes of openings by the use of a ring, e, preferably of either cork or rubber, which encircles the portion entering the orifice, and when crowded into place makes a tight joint, it being held in position by the flange 8. The bore or chamber of the nozzle is substantially cylindrical, and may be closed by a cork or wooden stopper, X, as indicated in dotted lines in Fig. 3.

In Fig. 4 is shown a modification in which the flange C of the jar is flared outward to form the discharge-mouth, and this opening may be closed by a plug or stopper. The flanges C on top and bottom add greatly to the convenience of burning in the kiln, as they permit the jars to be placed in stands. The flange on the bottom also affords a convenient hold in tilting a heavy jar to empty it.

The jug may be made in sections, if desired; or the bottom and body may be formed together and the top B afterward secured within the body by means well known to those skilled in the art.

I am aware that a jug with a plane top and integral projecting mouth-pieces, vents, and handle-lugs is not new; also, that a loose detachable earthenware cover or lid for a bowl has been provided with an upturned flange; and, finally, that removable spouts, *per se*, are not new, but have frequently been used in connection with various kinds of liquid-receptacles. My device, however, is an improved article of manufacture, and I disclaim the several constructions above referred to; but What I do claim is—

1. As a new article of manufacture, an earthenware jug having substantially-cylindrical body and plane top, an annular perforated flange extending evenly above the top, and an opening in the plane top adapted to receive interchangeable mouth pieces and covers, substantially as described.

2. In combination with the plane top of a jar or jug, a removable mouth-piece having a yielding packing-ring surrounding that portion of said mouth-piece which enters the orifice in such plane top, as described.

In testimony whereof I have signed my name to this specification in the presence of two subscribing witnesses.

THOMAS L. AMPHLETT.

Witnesses:
LOUIS H. JENNINGS,
DON. P. JONES.